(12) United States Patent
Rao et al.

(10) Patent No.: US 7,895,663 B1
(45) Date of Patent: Feb. 22, 2011

(54) SECURITY SYSTEM FOR COMMUNICATING DATA BETWEEN A MOBILE HANDSET AND A MANAGEMENT SERVER

(75) Inventors: Bindu Rama Rao, Laguna Niguel, CA (US); Patrick C. Lilley, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 759 days.

(21) Appl. No.: 11/688,820

(22) Filed: Mar. 20, 2007

Related U.S. Application Data (63) Continuation of application No. 10/695,713, filed on Oct. 29, 2003, now abandoned.

(60) Provisional application No. 60/422,048, filed on Oct. 29, 2002.

(51) Int. Cl.
*H04N 7/16* (2006.01)

(52) U.S. Cl. ........................................................ 726/27

(58) Field of Classification Search ....................... None
See application file for complete search history.

(56) References Cited

U.S. PATENT DOCUMENTS 5,954,817 A * 9/1999 Janssen et al. ............... 713/169
6,546,492 B1 * 4/2003 Walker et al. .................. 726/3

* cited by examiner

*Primary Examiner*—Brandon S Hoffman (57) ABSTRACT

A security system for communicating data between a mobile handset and a management server facilitates secure communication of data/code between a mobile handset and a carrier network employing a selective combination of at least a portion of a piece of information dynamically sent to the mobile handset by the carrier network and a static piece of information made available to the mobile handset. The mobile handset comprises a management client, device wrappers, a transport client and a device reader. The carrier network comprises a management server, a transport server, an optional provisioning system and an optional billing system.

37 Claims, 4 Drawing Sheets

SECURITY SYSTEM FOR COMMUNICATING DATA BETWEEN A MOBILE HANDSET AND A MANAGEMENT SERVER

RELATED APPLICATIONS

This patent application is a continuation of U.S. patent application Ser. No. 10/695,713, entitled "Security System For Communicating Data Between A Mobile Handset And A Management Server", filed Oct. 29, 2003, now abandoned which makes reference to, claims priority to and claims benefit from U.S. Provisional Patent Application Ser. No. 60/422,048, entitled "Security System for Communicating Data between a Mobile Handset and a Management Server," filed on Oct. 29, 2002.

The complete subject matter of each of the above-referenced United States Patent Applications is hereby incorporated herein by reference, in its entirety. In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "Systems And Methods For Updating And Distributing Information," filed Nov. 19, 2001 and having a publication date of Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates generally to security of communications, and more specifically, the security of data communications, such as update packages for software and firmware, between a mobile handset and a management server.

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both. Problems may arise when communicating data such as firmware/software updates between mobile electronic devices and the management servers that provide such data.

Security of mobile handsets has been handled, to some extent, by embedded security solutions employing security features built into a handset device. Cryptographic techniques have sometimes been employed to encrypt and decrypt data. Device authorization in mobile devices is one issue, and cryptographic protection is another issue in mobile device security. Device keys may be sometimes employed to provide for device authentication.

Further limitations and disadvantages of conventional and traditional approaches will become apparent to one of ordinary skill in the art through comparison of such systems with the present invention.

BRIEF SUMMARY OF THE INVENTION

Aspects of the present invention may be seen in a system that supports secure communication of data between an electronic device and a network, the system comprising the electronic device and the network. The electronic device comprising a first component that manages information in the electronic device; and a second component that provides access to proprietary information in the electronic device. At least one server manages the information communicated to the electronic device via the network. A first portion of information and a second portion of information is used to securely communicate data to the electronic device, the first portion of information and the second portion of information being managed by the at least one server and the first component to provide secure communication between the electronic device and the network.

In an embodiment of the present invention, the first portion of information comprises a first key and the second portion of information comprises a second key. In an embodiment of the present invention, the first key and the second key are combined to provide a higher level of security in the system and the data communication between the electronic device and the network relative to using the first key and the second key separately.

The method for securely communicating data and information in the system of the present invention, between an electronic device and a network, comprising storing a first security key; receiving a message containing a second security key; processing the received message; retrieving the second security key from the processed message; and generating a third security key.

In an embodiment of the present invention, the electronic device combines the first security key and the second security key to generate the third security key. The method further comprises employing the third security key for communication with the at least one server.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
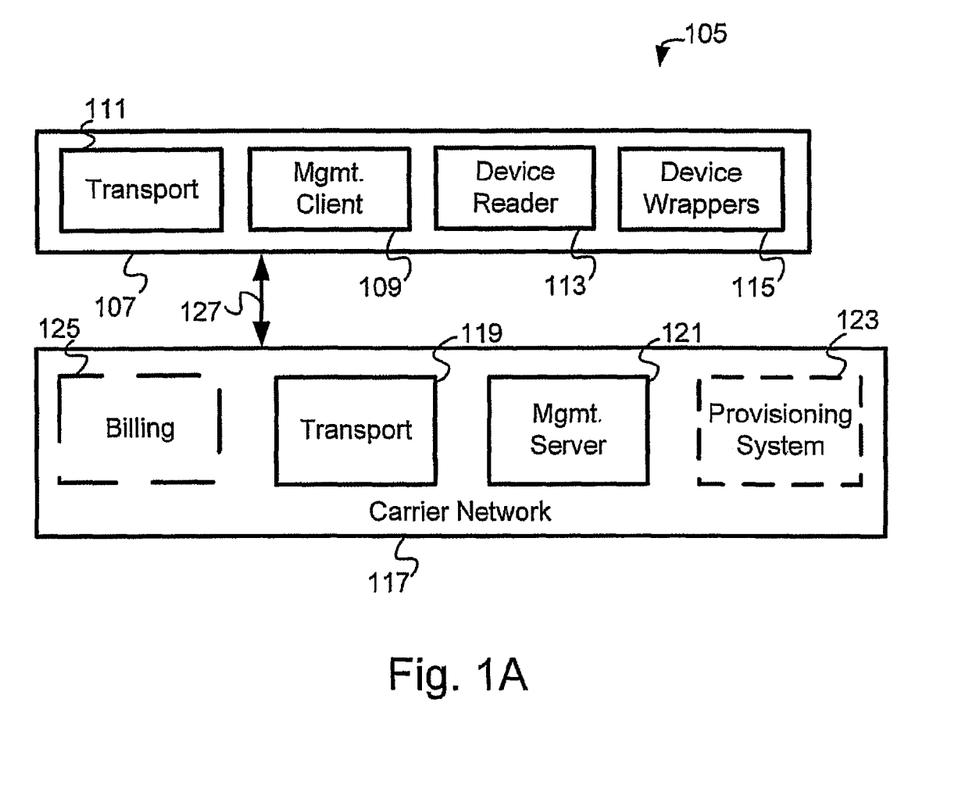
FIG. 1A illustrates a block diagram of an exemplary security system for communicating data between a mobile handset and a management server, in accordance with an embodiment of the present invention.

FIG. 1A illustrates a block diagram of an exemplary security system 105 for communicating data between a mobile handset and a management server, in accordance with an embodiment of the present invention. The security system 105 may facilitate secure communication of data/code between a mobile handset 107 and a carrier network 117. The carrier network 117 may employ a combination of at least a piece of information dynamically sent to the mobile handset 107 by the carrier network 117 and a portion of a static piece of information available to the mobile handset 107. The mobile handset 107 may comprise a management client 109, device wrappers 115, a transport client 111, and a device reader 113. The carrier network 117 may comprise a management server 121 and a transport server 119. In an embodiment of the present invention, the carrier network 117 may also comprise a provisioning system 123 and a billing system 125.

In an embodiment of the present invention, the manufacturer may provide the static piece of information available to the mobile handset 107. In such an embodiment, a wrapper provided as part of the device wrappers 115 may extract the static key. In another embodiment of the present invention, a carrier network may provide the static piece of information to the mobile handset 107 during a provisioning event of the mobile handset 107. In yet another embodiment of the present invention, a vendor whose software is installed on the mobile handset 107 may provide the static piece of information available to the mobile handset 107. In still another embodiment of the present invention, a management client 109 component of the mobile handset 107 may provide the static piece of information available to the mobile handset 107. In a further embodiment of the present invention, a Subscriber Identity Module (SIM) card inserted into the mobile handset 107 may provide the static piece of information available to the mobile handset 107.

In an embodiment of the present invention, the piece of information dynamically sent to the mobile handset 107 by the carrier network 117 may be communicated over a Wireless Application Protocol (WAP). In another embodiment of the present invention, the piece of information dynamically sent to the mobile handset 107 by the carrier network 117 may be communicated over a Short Message Service (SMS). In yet another embodiment of the present invention, the piece of information dynamically sent to the mobile handset 107 by the carrier network 117 may be communicated over a proprietary protocol.

The static piece of information may be a static key employed for security operations. The information dynamically sent to the mobile handset 107 may be a dynamic key, which may be combined with the static key to generate an encryption key, or a key for generating a hash code, etc.

In an embodiment of the present invention, the management client 109 may provide a secure storage and execution environment by employing a dynamic key and a static key for security, authentication, confidentiality, etc. The dynamic key may be either retrieved by the management client 109 from the management server 121 or sent to the management client 109 by the management server 121. In an embodiment of the present invention, the management server 121 may be capable of generating the dynamic keys based on user profile, device profile, device configuration and capabilities, update package availability, etc.

In an embodiment of the present invention, the management server 121 may determine whether the mobile handset 107 requires an update package. The management server 121 may also retrieve an address for the mobile handset 107 from the provisioning system 123, and generate a dynamic key for the mobile handset 107 based on a user profile retrieved from the provisioning system 123. The management server 121 may also assemble a notification message that contains the dynamic key, to be sent to the mobile handset 107, and instruct the transport server 119 to communicate the notification message to the mobile handset 107, and to subsequently process messages and/or requests sent to it by the mobile handset 107. These processed messages and/or requests may employ the dynamic key for security and/or authentication.

In an embodiment of the present invention, the management server 121, via the transport server 119, may send a dynamic key to the mobile handset 107 with a notification. The notification may, for example, inform a user about the availability of an update package. The management server 121 may encrypt the dynamic key by employing another key such as, for example, a content encryption key. The mobile handset 107 can decrypt the dynamic key using the same (in the case of symmetric keys) or a different (asymmetric keys) content encryption key. Only the management server 121 and the management client 109 in the mobile handset 107 may know the dynamic key. In an embodiment of the present invention, the dynamic key may be used in conjunction with a static key, such as an Electronic Serial Number (ESN) embedded in a mobile device 107, and retrieved employing the device wrappers 115. In an embodiment of the present invention, the dynamic key may also be used together with a number such as, for example, a device key retrieved by the device reader 113 from a SIM card or any similar card reader or device such as, for example, a smart card, an integrated circuit (IC) card, etc. In an embodiment of the present invention, the dynamic key may also be used with a handset key such as, for example, a static key or a device key embedded in the management client 109.

In an embodiment of the present invention, the static key may be a device key, which may be used to authenticate a mobile handset 107 to the carrier network 117. A user may be associated with the device key, and by extension, with the mobile handset 107. Other identifications may be employed in place of the device key by the carrier network 117. The combination of the static key of the mobile handset 107 and the dynamic key managed by the management client 109 provides a user with better security over prior art solutions. It is very difficult for a third party such as, for example, a "hacker" to capture both the static key as well as the dynamic key(s) to illegally access data communicated between the mobile handset 107 and the carrier network 117. The use of the static key and the dynamic key together greatly reduces the likelihood that a third party is able to capture the pieces required to compromise security.

In an embodiment of the present invention, the static key may be a system key that may be also used by the carrier network 117 to authenticate system data, such as firmware updates sent to the mobile handset device 107 from the management server 121. In an embodiment of the present invention, only the management client 109 may be capable of accessing static keys such as, for example, the device key and the system key. In such an embodiment, the management client 109 may not be able to manipulate or modify the device key and the system key. In another embodiment of the present invention, only the management client 109 may be capable of accessing and/or modifying the device key and the system key.

In an embodiment of the present invention, the combination of the device key and the system key may be used as a device-independent key at the application level. In such an embodiment, the key combination may be useful for generating digital signatures on data communicated between the mobile handset 107 and the carrier network 117.

In an embodiment of the present invention, the dynamic key received by the mobile handset 107 may be combined with a static key, which may be available at the mobile handset 107, to generate a private key. The generated private key may then be employed to secure communications with the management server 121. The corresponding public key belonging to the management server 121 may have be provided to the mobile handset 107, for example, during a provisioning process, as part of a default configuration. The mobile handset 107 may then retrieve the dynamic key and a static key to generate the private key. The mobile handset 107 may employ the generated private key to read data sent to the mobile handset 107 by the management server 121. The mobile handset 107 may also employ the public key of the management server 121 for securing data communicated to the management server 121.

In an embodiment of the present invention, the device wrappers 115 may provide access to device-specific information, device configuration information, data, etc., in the mobile handset 107. In an embodiment of the present invention, the device wrappers 115 may provide access to a device key that is managed by the mobile handset 107, the device key having been stored in the non-volatile memory of the mobile handset 107. In a related embodiment of the present invention, the device key may be a key provided by the manufacturer of the mobile handset 107. In yet another embodiment of the present invention, the device wrappers 115 may provide access to a device key that is managed by the management client 109 of the mobile handset 107. In such an embodiment, the device key may be provided by the vendor of the management client 109 and installed in the non-volatile memory of the mobile handset 107 when the management client 109 is installed into the mobile handset 107. In still another embodiment of the present invention; the device key may be provided to the mobile handset 107 when the mobile handset 107 is provisioned by the provisioning system 123.

In an embodiment of the present invention, the carrier network 117 may send a notification message to the mobile handset 107 via the transport server 119. The management server 121 may create the notification message to inform the user of the mobile handset 107 of an event such as, for example, the availability of a new update package for the mobile handset 107. The update package may be employed to update the firmware or software in the mobile handset 107. The management server 121 may contain a dynamic key with the notification message for its retrieval by the mobile handset 107. The mobile handset 107 may receive the notification message via the transport client 111, process the notification message, retrieve the dynamic key sent with the notification message or embedded in the notification message, and store the dynamic key for subsequent usage. The received dynamic key may be subsequently employed by the management client 109 of the mobile handset 107 to retrieve update packages, configuration data, etc. from the management server 121. The received dynamic key may be combined with a static key retrieved from the mobile handset 107 (using device wrappers 115, for example) to encode requests for data sent to the management server 121, to authenticate data sent by the management server 121, to create a digital signature that accompanies any communication sent to the management server 121, to decode data received from the management server 121, etc. The dynamic key may be employed for all subsequent data communication until a new dynamic key is delivered by the management server 121 to the mobile handset 107, until a preset time period expires, or until a preset number of activities such as, for example, firmware downloads, configuration updates, data downloads, etc., take place.

In an embodiment of the present invention, the transport server 119 may be a Wireless Application Protocol—(WAP) compliant gateway. The transport client 111 may be a WAP-based client that can communicate with a WAP server such as, for example, the transport server 119. The management client 109 may be capable of monitoring and parsing Wireless Markup Language (WML) data received from the management server 121, and retrieving any keys accompanying commands communicated to the management client 109 by the management server 121. The management client 109 may save the received keys and/or commands for subsequent processing. If the management client 109 determines that WML (or eXtensible Markup Language (XML)) content received from the management server contains a dynamic key, the management client 109 may save the dynamic key in non-volatile memory and employ it during later communications with the management server.

In an embodiment of the present invention, the transport server 119 may be incorporated into the management server 121. In another embodiment of the present invention, the transport client 111 may be incorporated into the management client 109.

Figure 1B:
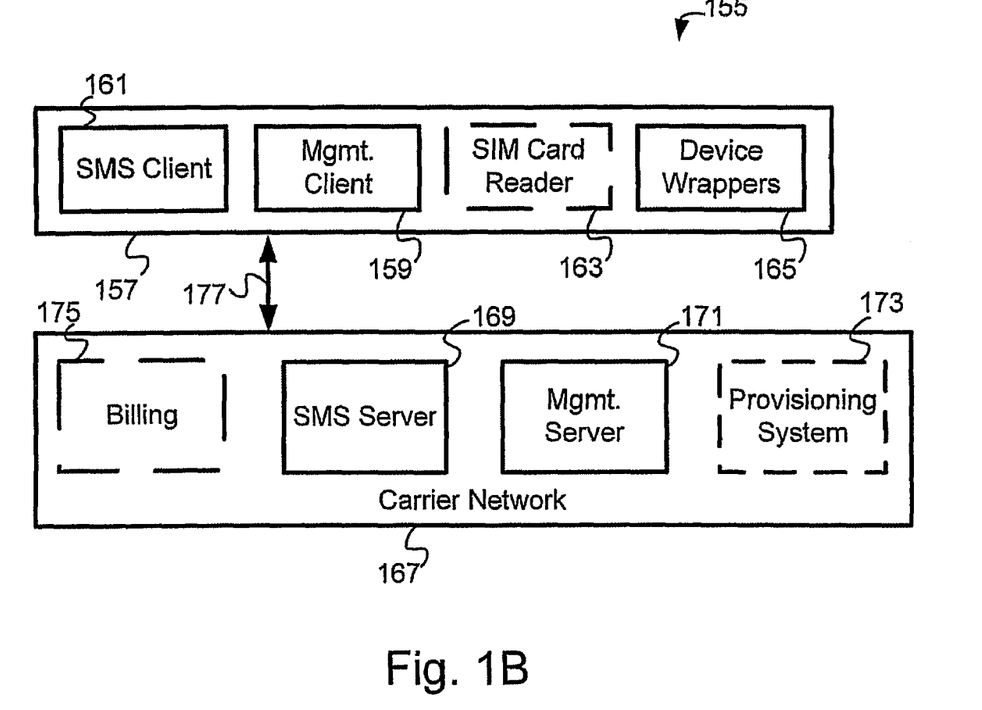
FIG. 1B illustrates a block diagram of an exemplary security system 155 for communicating data between a mobile handset and a management server, in accordance with an embodiment of the present invention.

FIG. 1B illustrates a block diagram of an exemplary security system 155 for communicating data between a mobile handset and a management server, in accordance with an embodiment of the present invention. The security system 155 may facilitate secure communication of data/code between a mobile handset 157 and a carrier network 167. The mobile handset 155 may comprise a management client 159, device wrappers 165, and a SMS client 161. In an embodiment of the present invention, the mobile handset 155 may also comprise a SIM card reader 163. The carrier network 167 may comprise a management server 171, and a SMS server 169. In an embodiment of the present invention, the carrier network 167 may also comprise a provisioning system 173 and a billing system 175.

In an embodiment of the present invention, the SMS server 169 may send a dynamic key to mobile handset 157 with a SMS (or other) notification, which may, for example, notify a user about the availability of an update package. The management server 121 may employ a content encryption key to encrypt the dynamic key. The mobile handset 157 may be capable of decrypting the dynamic key using the same content encryption key (in the case of symmetric keys) or using a different content encryption key (in the case of asymmetric keys). Only the carrier network 167 and the mobile handset 157 may know the dynamic key. The dynamic key may be used together with a static key such as, for example, an ESN contained in a mobile device, to provide for secure communications. In an embodiment of the present invention, the static key may be a number retrieved from a SIM card. In another embodiment of the present invention, the static key may be a mobile handset key embedded in the management client 159. In yet another embodiment of the present invention, the static key may be provided by the manufacturer, and may be extracted by a wrapper provided by the device wrappers 165. In a further embodiment of the present invention, a SIM card may provide the static key. In still another embodiment of the present invention, the management client 159 may provide the static key.

Figure 2:
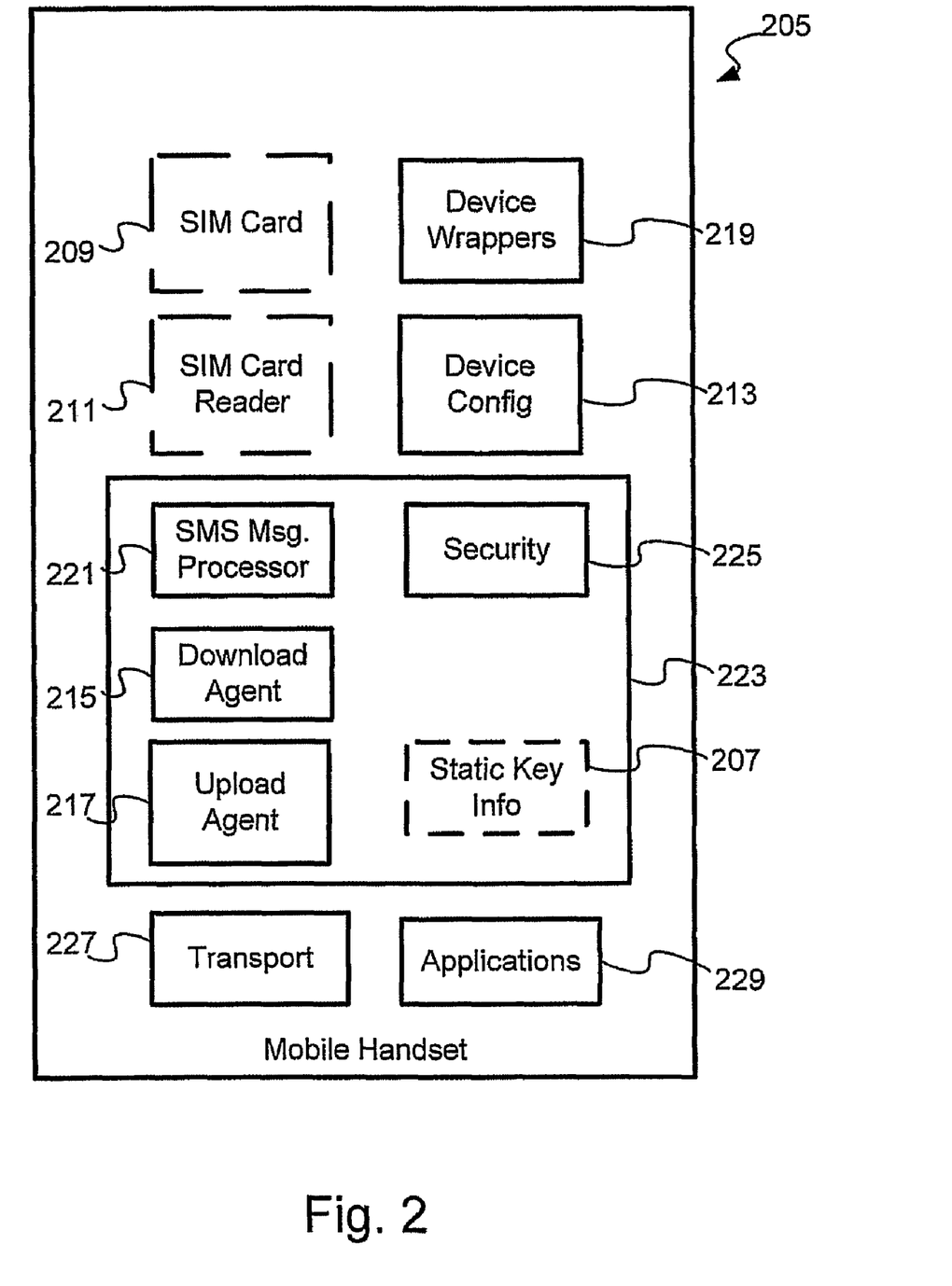
FIG. 2 illustrates a block diagram of an exemplary mobile handset employing a management client to manage secure communications of data/code with external systems, in accordance with an embodiment of the present invention.

FIG. 2 illustrates a block diagram of an exemplary mobile handset 205 employing a management client 223 to manage secure communications of data/code with external systems such as a carrier network, in accordance with an embodiment of the present invention. The mobile handset 205 may comprise a management client 223, a transport client 227, applications 229, device configuration information 213, and device wrappers 219. In an embodiment of the present invention, the mobile handset 205 may further comprise a SIM card 209 and a SIM card reader 211. The management client 223 may comprise an upload agent 217, a download agent 215, a SMS Message Processor 221, and a security manager 225. In an embodiment of the present invention, the management client 223 may further comprise static key information 207.

The security manager 225 may be employed to facilitate secure communications based on encoding, encryption, authentication, etc. The security manager 225 allows accessing and storing static key information 207 that may be provided by the manufacturer at manufacturing time, or by a carrier during service provisioning. The security manager 225 may also support management of the life cycle of the static key information 207. In an embodiment of the present invention, the security manager 225 may facilitate accessing (via the SIM card reader 211) and manipulating security-related information provided by the SIM card 209. The security manager 225 may support retrieval and storage of dynamic keys communicated to the mobile handset 205 by external systems such as, for example, a carrier network. Such dynamic keys may be embedded in or enclosed within messages and/or notifications sent to the mobile handset 205 by the external systems. The security manager 225 may also be employed to encrypt/decrypt data that is sent to/received from the external systems. The security manager 225 may create message digests, digital signatures, etc. In an embodiment of the present invention, the security manager 225 may support public-key/private-key-based encryption/decryption. In such an embodiment, the security manager 225 may access the public key of external systems such as, for example, the management server of a carrier network. The public key may be then stored locally. In another embodiment of the present invention, the security manager 225 may also facilitate the modification and life cycle management of such public-keys.

In an embodiment of the present invention, the security manager 225 may utilize the SMS message processor 221 to monitor and process incoming SMS messages to retrieve dynamic keys. The dynamic keys may be sent with messages, notification, and/or data, which may be sent by an external system such as, for example, a carrier network.

In an embodiment of the present invention, the upload agent 217 may be employed to apply firmware/software updates retrieved from an external system. The device configuration information 213 may comprise device configurations such as addresses of RAM, ROM, FLASH, the sizes of volatile and non-volatile memory, etc. The download agent 215 may be used to download update packages for firmware/software. The transport client 227 may be employed to facilitate downloads performed by the download agent 215.

Figure 3:
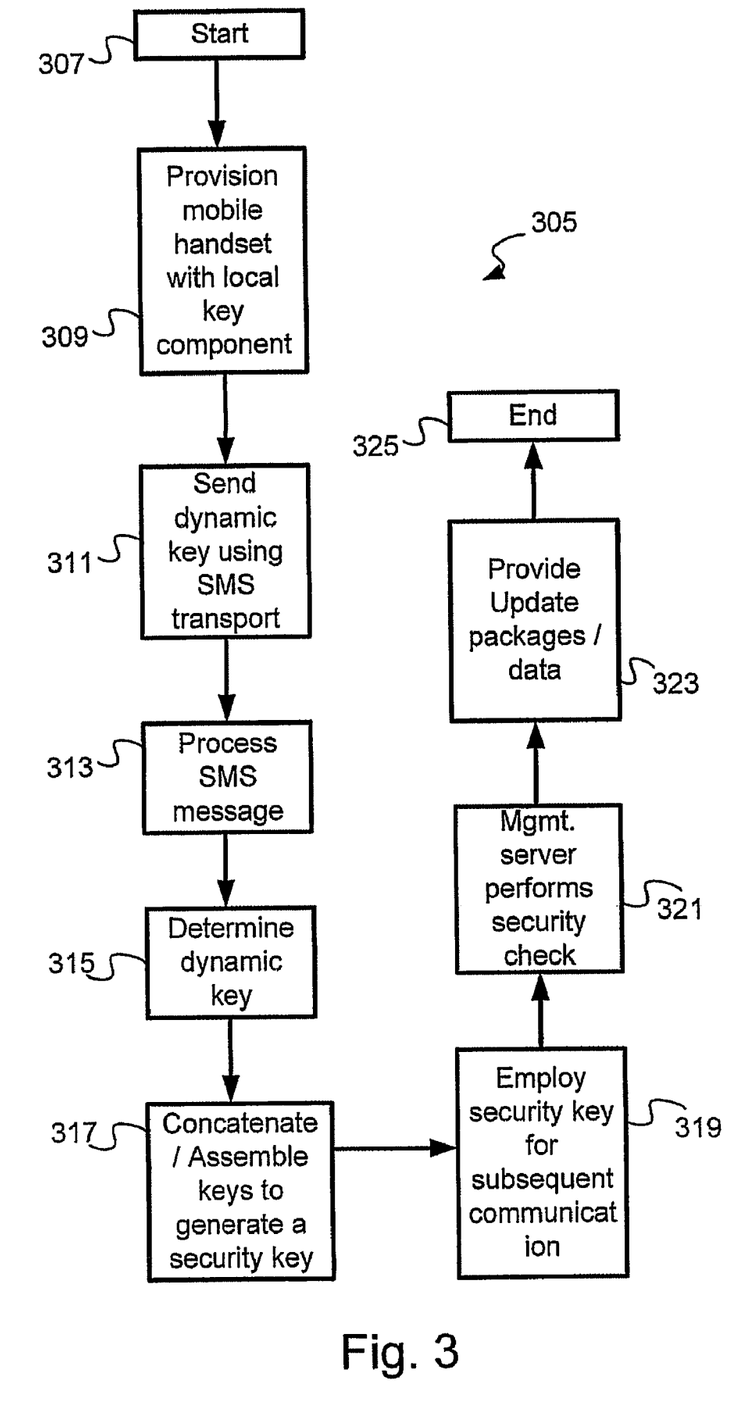
FIG. 3 illustrates a flow diagram of an exemplary method of operating a secure system for communicating data between a mobile handset and a management server, in accordance with an embodiment of the present invention.

FIG. 3 illustrates a flow diagram 305 of an exemplary method of operating a secure system for communicating data between a mobile handset and a management server, in accordance with an embodiment of the present invention. At a start block 307, the user may acquire the mobile handset, and the carrier network may provision the handset for service. Then, at block 309, the mobile handset may be provisioned with a local key component such as a static key. In an embodiment of the present invention, the static key may be a device key. In another embodiment of present invention, the local key may be a system key. In another embodiment of present invention, the local key component may be a set of a device key and a system key. Other sets of keys may also be contemplated.

A SMS message may contain the dynamic key associated with the mobile handset. The SMS message with the dynamic key may be sent, at block 311, by the management server of a carrier network via a SMS server used as a transport server. In an embodiment of the present invention, the dynamic key may be sent as part of the text section of a SMS message. In such an embodiment, the dynamic key is included in the SMS message and the mobile handset parses the received message, and retrieves the dynamic key if one is included. In another embodiment of the present invention, the dynamic key may be attached as part of the data of a SMS message and the mobile handset can retrieve data (such as the dynamic key) associated with received SMS messages. The mobile handset may process SMS messages at block 313. Then, at block 315, the mobile handset may determine the dynamic key by parsing the SMS message and retrieving the dynamic key for subsequent usage. In an embodiment of the present invention, the mobile handset may also store the dynamic key in non-volatile memory such as FLASH.

The mobile handset may then retrieve the static key employing device wrappers, and generate a security key, at a block 317. In an embodiment of the present invention, the security key may be generated by concatenating the static key and the dynamic key. In another embodiment of the present invention, the security key may be combined with the dynamic key employing a key generation function.

Next, at block 319, the mobile handset may employ the security key to communicate with the management server, and send and receive data/code. In an embodiment of the present invention, the mobile handset may use the security key as a symmetric private key to encrypt data that is communicated to the management server of a carrier network. The management server may then generate and employ the same security key to decrypt data sent to it by the mobile handset. In another embodiment of the present invention, the mobile handset may use the security key as a private key, and may decrypt data sent to it by the management server of a carrier network. In yet another embodiment of the present invention, the mobile handset may employ a public key of the management server. The public key may be retrieved employing device wrappers or SIM cards, and used to encrypt data sent to the management server. In another embodiment of the present invention, the public key may be retrieved from non-volatile memory.

The management server of the carrier network may, at block 321, verify the access from the mobile handset by performing a security check. In an embodiment of the present invention, the security check may involve decrypting the received data/message/request by using a private key and ensuring that the received data/message/request is valid and authorized. Other forms of security checks may be also utilized. In an embodiment of the present invention, symmetric key generation and validation of data sent by the mobile handset may also be employed.

A user may utilize the mobile handset to request update packages, and the request may be processed and update packages and/or data may be provided to an authorized user at block 323. The processing for communicating data may then be completed at block 325.

In an embodiment of the present invention, Internet Over The Air (IOTA) and Synchronization Markup Language—(SyncML) based data transport mechanisms may be employed to communicate the dynamic key (or encoded/encrypted versions of one or more dynamic keys) from the server-side to the client side. The client-side may monitor data provided by the server-side to determine whether dynamic key(s) are included in the data. If a dynamic key(s) is determined to exist in the data, it may be retrieved and stored for subsequent access/usage.

In an embodiment of the present invention, the life cycle of dynamic keys may be managed by the mobile handset. An expiration date may be specified/provided along with the dynamic key(s). If an expiration date is not specified, a default expiration date for the dynamic key(s) may be supplied by the mobile handset.

In an embodiment of the present invention, the dynamic key may be employed to create a symmetric key in the mobile handset. In such an embodiment, other information may also be employed along with the dynamic key, to create the symmetric key in the mobile handset. In another embodiment of the present invention, the dynamic key may be employed to create a private key in the mobile handset. In such an embodiment, other information may be also employed along with the dynamic key to create the private key in the mobile handset. In such an embodiment, a public key corresponding to the private key may be available from the mobile handset. Other security-related uses for the dynamic key are also contemplated.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting secure communication of data between an electronic device and at least one server, via a communication network, the system comprising:
    an electronic device comprising:
        a first component that manages information in the electronic device; and
        a second component that provides access to information in the electronic device; and
    wherein the at least one server manages information communicated to the electronic device via the communication network, and wherein a dynamic first information item managed by the at least one server and the first component, and a static second information item are combined to generate a third information item used to securely communicate data between the at least one server and the electronic device via the communication network,
    wherein the first information item is communicated using a communication protocol, a wireless application protocol, or a short message service.

2. The system according to claim 1 wherein the first information item is sent to the electronic device by the at least one server.

3. The system according to claim 1 wherein the second information item is accessible to the electronic device.

4. The system according to claim 3 wherein the second information item reside in a subscriber identity module (SIM) card.

5. The system according to claim 3 wherein the second information item comprises an electronic serial number (ESN).

6. The system according to claim 1 wherein the first information item is combined with the second information item to generate information used for encryption.

7. The system according to claim 1 wherein the first information item comprises a first key and the second information item comprises a second key.

8. The system according to claim 7 wherein the first component retrieves the first key from the at least one server.

9. The system according to claim 7 wherein the at least one server sends the first key to the first component.

10. The system according to claim 7 wherein the at least one server generates the first key.

11. The system according to claim 7 wherein the first key is generated for the at least one server.

12. The system according to claim 7 wherein the first key and the second key are combined to provide a higher level of security in the system and the data communication between the electronic device and the network relative to using the first key and the second key separately.

13. The system according to claim 7 wherein the at least one server assembles a message that contains the first key and communicates the message to the electronic device.

14. The system according to claim 13 wherein the at least one server communicates with the electronic device via a proprietary communication protocol.

15. The system according to claim 13 wherein the electronic device processes the message to retrieve the first key.

16. The system according to claim 1 wherein the first component comprises:
    a first agent that downloads data and information onto the electronic device;
    a second agent that applies the downloaded data and information onto appropriate applications in the electronic device; and
    a first manager that facilitates secure communications.

17. The system according to claim 16 wherein the electronic device further comprises a third component that facilitates downloads performed by the second agent of the first component of the electronic device.

18. The system of claim 1, wherein the dynamic first information item expires after a preset time period.

19. The system of claim 18, wherein the preset time period is determined by the at least one server.

20. The system of claim 18, wherein the preset time period is determined by the electronic device.

21. The system of claim 1, wherein the dynamic first information item expires after a preset number of communications between the at least one server and the electronic device occur.

22. The system of claim 1, wherein the dynamic first information item expires after a replacement dynamic first information item is delivered by the at least one server to the electronic device.

23. The system of claim 1, wherein the dynamic first information item is based on a characteristic of the electronic device.

24. The system of claim 1, wherein the dynamic first information item is based on a characteristic of a user of the electronic device.

25. A method for securely communicating information between an electronic device and a network, the network comprising at least one server that manages communication via the network, the method comprising:
    retrieving a static first security key located at the electronic device;
    receiving a message containing a dynamic second security key from the at least one server;
    generating a third security key by combining the first and second security keys; and
    employing the third security key to securely communicate information between the at least one server and the electronic device.

26. The method according to claim 25 wherein the at least one server uses a copy of the third security key to decrypt information received from the electronic device.

27. The method according to claim 25 wherein the electronic device utilizes the third security key to decrypt data received from the at least one server.

28. The method according to claim 25 wherein the method further comprises performing a security check to verify an access activity from the electronic device.

29. The method according to claim 28 wherein the access activity from the electronic device comprises a request for information.

30. The method according to claim 29 wherein the method further comprises processing the request of the electronic device.

31. An electronic device comprising:
- interface circuitry for transmitting and receiving information via a wireless network;
- at least one processor operably coupled to the interface circuitry and to memory in the electronic device;
- a housing for holding the at least one processor, the interface circuitry, and the memory;
- a user interchangeable memory card which, when communicatively coupled to the at least one processor, enables the electronic device to perform secure firmware updates to the memory using a first key in the user interchangeable memory card; and wherein the electronic device employs the first key to authenticate information received from an external system for updating firmware.

32. The electronic device according to claim 31, further comprising: a first manager that manages a life cycle of the first key; and
- wherein the first manager, during operation, functions to at least one of: encrypt data sent to the external system and decrypt data received from the external system.

33. The electronic device according to claim 32 wherein the external system comprises a management server.

34. The electronic device according to claim 31 wherein the electronic device decrypts information for updating firmware based on the first key, and wherein the information for updating firmware is provided by the external system.

35. The electronic device according to claim 31, wherein the electronic device decrypts information for updating firmware based on the first key and a second key, and wherein the information for updating firmware is provided by the external system.

36. The electronic device according to claim 35, wherein the second key is one of: received by the electronic device and computed by the electronic device.

37. The electronic device according to claim 31, wherein the user interchangeable memory card comprises one of a SIM card and a smart card.

* * * * *